United States Patent
Pisharodi (10) Patent No.: US 8,816,644 B2
(45) Date of Patent: Aug. 26, 2014

(54) INTERRUPTING THE CHARGING STATUS OF A RECHARGEABLE BATTERY

(71) Applicant: Madhavan Pisharodi, Brownsville, TX (US)

(72) Inventor: Madhavan Pisharodi, Brownsville, TX (US)

(73) Assignee: Perumala Corporation, Brownsville, TX (US)

( * ) Notice: Subject to any disclaimer, the term of this patent is extended or adjusted under 35 U.S.C. 154(b) by 0 days.

(21) Appl. No.: 14/094,305

(22) Filed: Dec. 2, 2013

(65) Prior Publication Data

US 2014/0132224 A1    May 15, 2014

Related U.S. Application Data

(63) Continuation-in-part of application No. 13/590,896, filed on Aug. 21, 2012, now Pat. No. 8,598,850, which is a continuation-in-part of application No. 13/199,429, filed on Aug. 30, 2011.

(51) Int. Cl.
*H02J 7/04* (2006.01)
*H02J 7/16* (2006.01)

(52) U.S. Cl.
USPC .......................... 320/149; 320/111; 320/155

(58) Field of Classification Search
USPC ....................................................... 320/149
See application file for complete search history.

(56) References Cited

U.S. PATENT DOCUMENTS

| | | |
|---|---|---|
| 3,855,516 A | 12/1974 | Fairchild |
| 4,289,836 A | 9/1981 | Lemelson |
| 4,302,714 A | 11/1981 | Yefsky |
| 4,668,902 A | 5/1987 | Zeller, Jr. |
| 4,829,226 A | 5/1989 | Nakamura |
| 5,075,614 A | 12/1991 | Whiting |
| 5,179,335 A | 1/1993 | Nor |
| 5,283,511 A | 2/1994 | Keener |
| 5,497,067 A | 3/1996 | Shaw |
| 5,592,070 A | 1/1997 | Mino |
| 5,627,882 A | 5/1997 | Chien |
| 5,637,979 A | 6/1997 | Tamai |
| 5,936,385 A | 8/1999 | Patillon |
| 6,043,631 A | 3/2000 | Tsenter |
| 6,326,767 B1 | 12/2001 | Small |

(Continued)

OTHER PUBLICATIONS

"Environplug—Mobile Phone Energy Saving Adapter;" Nov. 15, 2010; http://www.envirogadget.com/office-eco-gadgets/enviroplug-mobile-phone-energy-saving-adapter/.

(Continued)

*Primary Examiner* — Arun Williams
(74) *Attorney, Agent, or Firm* — D'Ambrosio & Menon, PLLC; Usha Menon (57) ABSTRACT

Interrupting the charging status of a rechargeable battery comprises providing a timer operable electrical extension cord. The extension cord comprises a conducting cable or media capable of transmitting electric current providing desired extended operative connection between at least a power input connector to a power source or one or more electrical sockets at one end of the conducting media and a power output connector at other end of the conducting media to any intermittently operable or charge dependent electrically operable unit. The extension cord includes a timer for continuously tracking the desired time duration for which the switch is to be either in an on state or in an off state. The timer cooperates with a controller to trigger a corresponding change in a switching state of the extension cord.

17 Claims, 4 Drawing Sheets

(56) References Cited

U.S. PATENT DOCUMENTS

| | | |
|---|---|---|
| 6,617,827 B2 | 9/2003 | Knish |
| 6,909,259 B2 | 6/2005 | Chung |
| 6,956,353 B1 | 10/2005 | Klitzner |
| 7,111,179 B1 | 9/2006 | Girson |
| 7,498,770 B1 * | 3/2009 | Caldwell, II .................. 320/125 |
| 2004/0066171 A1 | 4/2004 | Mori |
| 2005/0266301 A1 | 12/2005 | Smith et al. |
| 2008/0290839 A1 | 11/2008 | Hayashi |
| 2008/0296975 A1 | 12/2008 | Shakespeare et al. |
| 2009/0179615 A1 | 7/2009 | Amron |
| 2010/0148729 A1 | 6/2010 | Johnson et al. |
| 2010/0188043 A1 | 7/2010 | Kelty et al. |
| 2010/0289456 A1 | 11/2010 | Veselic et al. |
| 2011/0279080 A1 * | 11/2011 | Fischer et al. ................. 320/107 |

OTHER PUBLICATIONS

"Eco Charger with Apple Compatible Adapter for Cell Phone by Volt Star;" Sep. 27, 2010; http://www.envirogadget.com/energy-saving/eco-charger-with-apple-compatible-adapter-for-cell-phone-by-volt-star/.

Search report and Written Opinion dated Nov. 15, 2012 for co-pending PCT patent app. No. PCT/US2012/052797.

* cited by examiner

INTERRUPTING THE CHARGING STATUS OF A RECHARGEABLE BATTERY

PRIORITY CLAIM

This application is a continuation-in-part of and claims priority to U.S. Ser. No. 13/590,896 filed Aug. 21, 2012, which is a continuation-in-part and claims priority to U.S. Ser. No. 13/199,429 filed Aug. 30, 2011 and is now abandoned, the contents of both applications are incorporated by reference herein.

FIELD OF THE INVENTION

The invention relates generally to optimizing the life of a rechargeable battery, and more particularly, to devices and methods for interrupting the charging and/or discharging status of a rechargeable battery.

BACKGROUND

Almost every type of rechargeable battery (lead-acid, nickel-cadmium, nickel-metal hydride, lithium, etc.) can be damaged and/or its operating capacity can be reduced by what is often referred to as overcharging. Many such devices, the chargers for such batteries, and sometimes even the batteries themselves, are provided with indicator lights or other alerts to inform the user that the battery is fully charged, prompting a user that the device or battery should be removed from the charger once charging is complete. Further, the instruction manuals of almost every such device include warnings, some of them prominent, that the device not be overcharged and/or that the device should be removed from the charger or power source when the charge indicator appears.

In actual practice, however, the users of devices that are powered by rechargeable batteries tend to leave the battery, or the device including the battery, on the charger or connected to a power source from the time charging starts until the device or battery is unplugged for subsequent use. As a result, the battery is often left on the charger and/or the device including the battery stays connected to a power source for many hours longer than needed to recharge the battery (newly-developed battery technology has produced batteries that charge in minutes rather than hours with the result that the battery and/or device stays on the charger far longer than necessary), despite the prominent warnings against overcharging.

SUMMARY

In one embodiment, interrupting the charging status of a rechargeable battery comprises providing a timer operable electrical extension cord comprising: a conducting cable or media capable of transmitting electric current providing desired extended operative connection between at least a power input connector to a power source or electrical sockets at one end of the conducting media and a power output connector at other end of the conducting media to any intermittently operable or charge dependent electrically operable unit; a controller and cooperative timer based switchable on and off electrical operation operatively connected to the conducting media and separated from the connector to a power source or electrical sockets for intermittently or charge dependent electrical operation; a switch configured to selectively be in either the switchable on or off state wherein the switchable on state operatively connects the intermittently operable or charge dependent electrically operable unit with the power source or electrical sockets and the switchable off state operatively disconnects the intermittently operable or charge dependent electrically operable unit with the power source or electrical sockets; and a timer for continuously tracking the desired time duration for which the switch is to be either in the on state or in the off state and cooperating with the controller to trigger a corresponding change in the switching state of the extension cord.

In another embodiment, a method for intermittently interrupting the electrical communication between the intermittently operable or charge dependent electrically operable unit and a power source or electrical socket involving a timer operable electrical extension cord, comprises: providing operative connection of the intermittently operable or charge dependent electrically operable unit to the power source through the timer operable electrical extension cord comprising: a conducting cable or media capable of transmitting electric current, the conducting media providing a desired extended operative connection between at least a power input connector to a power source or one or more electrical sockets at one end of the conducting media and a power output connector at an other end of the conducting media to any intermittently operable or charge dependent electrically operable unit; a controller and a cooperative timer based switchable on and off electrical operation operatively connected to the conducting media and separated from the connector to a power source or electrical sockets for intermittently or charge dependent electrical operation; a switch configured to selectively be in either the switchable on or off state wherein the switchable on state operatively connects the intermittently operable or charge dependent electrically operable unit with the power source or electrical sockets and the switchable off state operatively disconnects the intermittently operable or charge dependent electrically operable unit with the power source or one or more electrical sockets; and a timer for continuously tracking the desired time duration for which the switch is to be either in the on state or in the off state and cooperating with the controller to trigger a corresponding change in the switching state of the extension cord; disposing the switch either in the on state for providing operative connection between the power input connector and the power output connector through the conducting media in order to dispose the electrically operable unit in electrical communication with the electrical socket or in the off state for disabling the operative connection between the power input connector and the power output connector through the conducting media in order to detach the electrically operable unit from the electrical socket; receiving the time duration for disposing the switch in the respective state through the controller; initiating the time tracking by involving the timer and producing signal to the controller on elapsing the time duration; and triggering a change in the switch state by involving the controller on receiving the signal from the timer.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Figure 1:
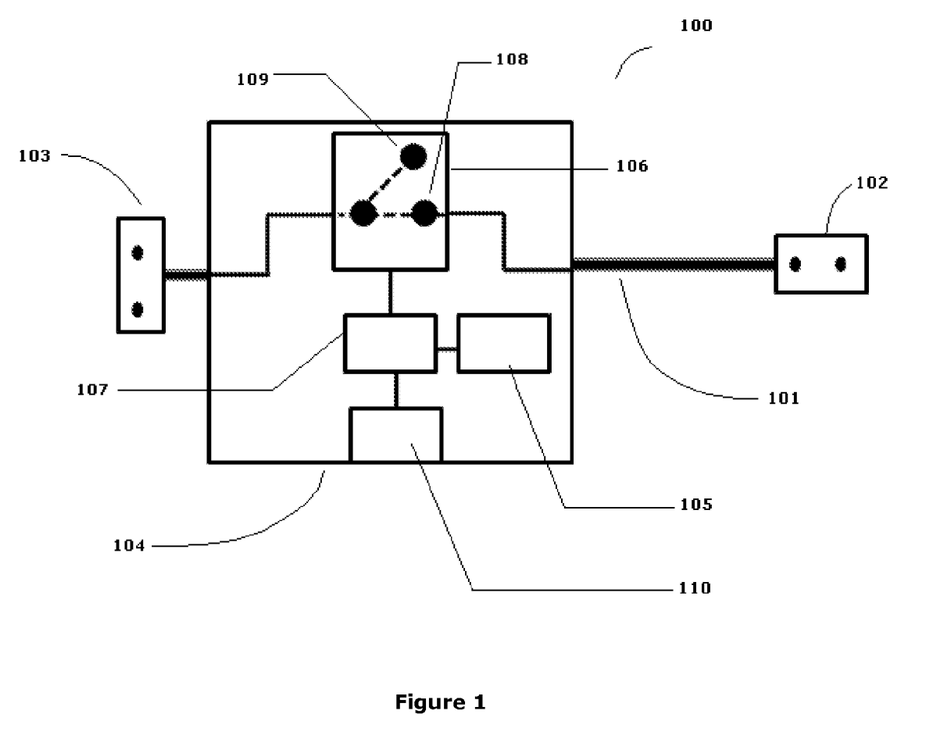
FIG. 1 depicts a schematic of a device for interrupting the charging status of a rechargeable battery in accordance with one or more embodiments of the invention.

FIG. 1 depicts a block representation of the electrical extension cord 100 with a built in time dependent electrical connection OFF/ON mechanism in accordance with one or more embodiments of the present invention. The term "extension cord" as used herein is intended to include an adaptor cord, a power strip, a power extender and an extension lead. In particular, the embodiment of the present invention as shown in the accompanying FIG. 1 by block representation discloses a timer operable electrical extension cord 100 for establishing intermittently enabled electrical communication between a power source or one or more electrical sockets and any intermittently operable or charge dependent electrically operable unit or appliances.

The electrical extension cord 100 comprises a conducting media or cable 101 of desired length, capable of transmitting electric current from power source or electrical sockets to the distant electrical unit or appliances. The conducting media 101 includes a power input connector 102 at its one end for establishing electrical communication with the power source or electrical sockets. The other end of the conducting media 101 comprises a power output connector 103 for accepting a plug from an intermittently operable electrical unit or appliance or from a charge dependent electrically operable unit such as device incorporating a rechargeable battery (not shown). In one embodiment, a time based electrical connection controlling module 104 is provided inline with the conducting media 101 and separated from the power input connector 102. The electrical connection controlling module 104 comprises a timer 105, a switch 106 and a controller 107.

The switch 106 of the inline electrical connection controlling module 104 is configured to selectively be in either a closed or on state 108 or an open or off state 109. The switch state 108, 109 determines whether the electrical unit or appliance will be in an electrical communication with the power source or electrical sockets. The closed state or on 108 of the switch 106 corresponds to an enable state wherein the appliance is disposed in electrical communication with the power source or electrical sockets and the electricity flows from the power source or electrical sockets to the appliance via the conducting media 101. Conversely, open or off state 109 of the switch 106 corresponds to a disable state in which the electrical communication between the power source and the appliance is disabled and the electricity can not flow from the power source to the appliance.

The switching state of the switch 106 is controlled by the controller 107 and the cooperative timer 105. The timer 105 of the inline electrical connection controlling module 104 continuously tracks the desired amount of time for which the switch 106 is to be in the open state 109 or the amount of time the switch 106 is to be in the closed state 108. After the time for which the switch 106 is to be in the closed or open state elapses, the timer 105 produce a signal to the controller 107 and in accordance with the signal received, the controller 107 triggers a change in the switch state instantly or after a previously specified time delay.

Figure 2:
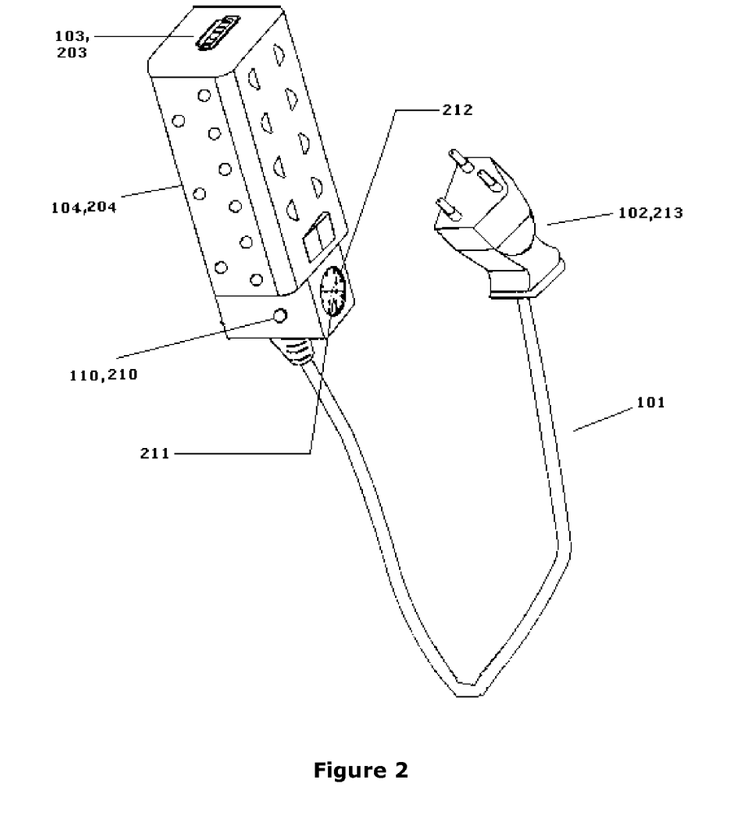
FIGS. 2-4 each depict a perspective view of a device for interrupting the charging status of a rechargeable battery in accordance with one or more embodiments of the invention.

In one or more embodiments, referring to FIGS. 1 and 2, the timer 105 may comprise an analog display 211. The controller 107 may further comprise an input terminal 110 through which provision of instructions including time duration for enabling and/or disabling the electrical communication between the appliance and the power source or electrical sockets to the timer 105 may be facilitated. The input terminal 110 may comprise a rotary dial 210. In one or more embodiments, a plurality of input terminals (not shown) may be provided for each socket.

Figure 3:
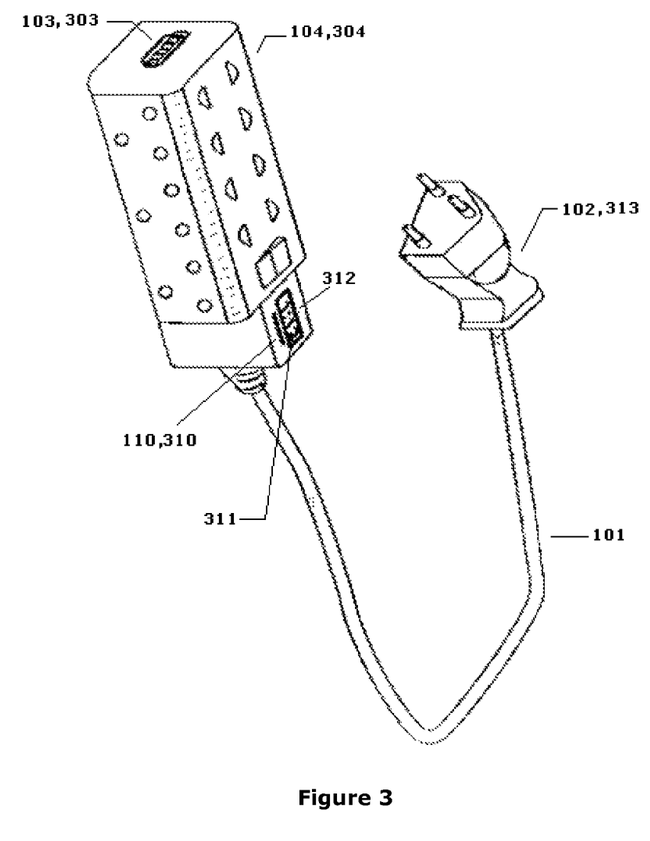

In other embodiments, referring to FIGS. 1 and 3, the timer 105 may comprise a digital display 311. The input terminal 110 may comprise a keypad 310. However, referring to FIGS. 1-3, any mechanism suitable for facilitating the provision of instructions to the timer 105 may be used as an input terminal 110. Moreover, the rotary dial 210, or any other mechanism used as the input terminal 110, may comprise analog time duration indicia 212 or digital time duration indicia 312.

Referring now to FIGS. 1-3, the timer 105 may be configured to receive instructions corresponding to the duration of time between the timer 105 receiving the instructions and the timer 105 producing a signal to the controller 107 which triggers a change of the switch state instantly or after a previously specified time delay.

Therefore, the electrical extension cord 100 having a conducting media 101 with desired length and capable of transmitting electric current facilitates to dispose electrical unit or appliance in active electrical communication with electrical sockets which are difficult for a user to reach (since it may be behind a heavy desk, for example). Additionally, the integrated electrical connection controlling module 104, having controller 107 and a cooperative timer 105 based switch 106, disposed in line with the said conducting media 101 and separated from said power input connector 102 capable of intermittently on and off the communication with the electrical sockets allows user to conveniently set the timer for off or on the electrical unit or appliance without having to reach behind some heavy/difficult to move object to connect/disconnect the cord.

Further, the electrical extension cord 100 is particularly useful for intermittently operable electrical units or appliances which are difficult to place nearer to the electrical sockets for example, a Christmas tree. The long conducting media 101 of the current extension cord 100 allows user to connect the Christmas tree light with electric socket and the inbuilt electrical connection controlling module 104 control on/off of the lights irrespective of the connection status of the cord with the electrical socket.

Figure 4:
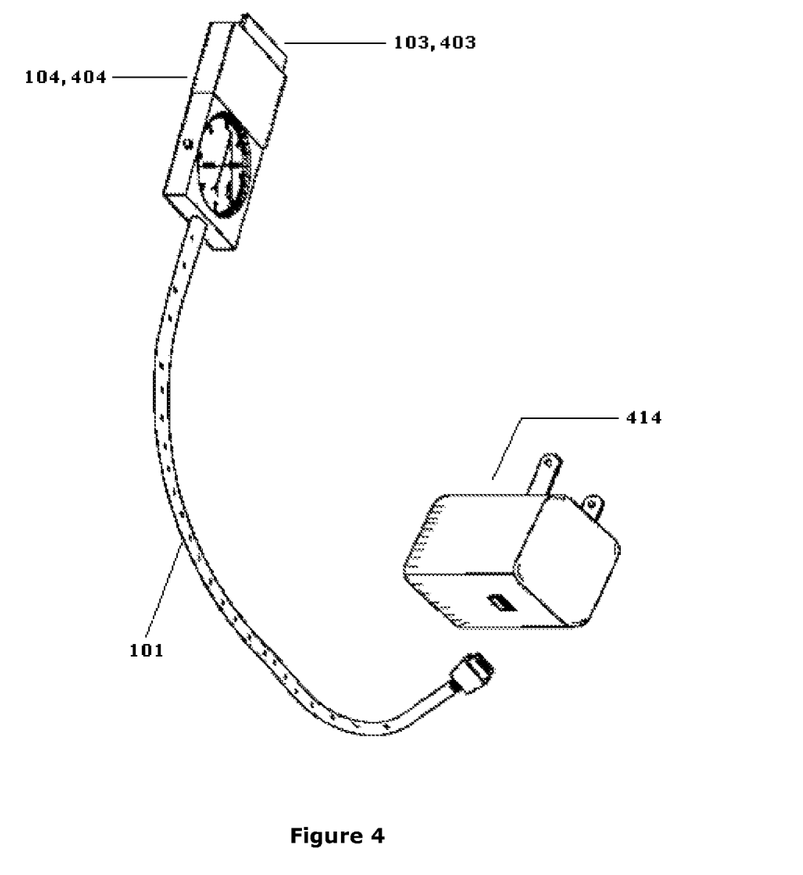

One or more embodiments of the time dependent electrical connection interrupting extension cord 100 may comprise a plug at the power input connector 102 adapted for placement in electrical communication with any other type of power source or electrical socket. The power input connector 102 may comprise one or more male contacts 213 or 313. In one or more embodiments, referring to FIGS. 1 and 4, the extension cord 100 may comprise a socket adaptor 414 to adapt a first type of socket to a desired second type of socket. For example, as shown in the figure, the socket adaptor may adapt a North American standard 120V AC socket to a USB port.

Referring to FIGS. 1-4, the electrical connection controlling module 104 of the present extension cord 100 may further comprise an enclosure 204, 304 or 404. The enclosure 204, 304 or 404 may house the internal components and/or circuitry of the electrical connection controlling module 104. The power output connector 103 of the present extension cord 100 may comprise one or more female contacts 203, 303 or 403 for receiving a plug capable of transferring power to an appliance or a device incorporating a rechargeable battery. The power output connector 103 may further comprise one or more male contacts.

In one or more aspects, wherein the present electrical extension cord 100 is involved to establish an electrical communication between the charge dependent electrically operable unit i.e. device incorporating rechargeable battery and electrical sockets or power source in order to charge the rechargeable battery, the time based electrical connection controlling module 104 may timely disable or enable electrical communication between the power source or electrical sockets and the receiving plug from device incorporating rechargeable battery for ensuring a fixed charge level the rechargeable battery. The controller 107 of the electrical connection controlling module 104 may automatically set and/or adjust time duration for which the switch 106 is to be either in on state or in off state for charging the rechargeable battery upto a fixed or predefined charge level. In other word, the controller 107 can quantify the amount of time for which the switch 106 is to be in the on state for providing operative connection between the power input connector 102 and the power output connector 103 through the conducting media 101 in order to dispose the device incorporating rechargeable battery in electrical communication with the electrical socket for charging the rechargeable battery or in the off state for disabling the said operative connection between the power input connector and the power output connector through the conducting media in order to detach the device incorporating rechargeable battery from the electrical socket so that the rechargeable battery can discharge and the rechargeable battery can reach to a certain predefined level.

The controller 107 can further comprise memory blocks for storing charge behavior data of the rechargeable battery. The controller 107 determines the state of the switch 106 and estimates time value, for which the switch 106 should be disposed in that state so as to the charge level of the rechargeable battery can reach to a certain predefined level, by gauging the charge level of the rechargeable battery; reading the stored charge behavior data of the rechargeable battery; and extrapolating based on the gauged charge level and the stored charge behavior data. Gauging the charge level may involve calculating a ratio of the amount of charge remaining in the rechargeable battery to the total charge capacity of the rechargeable battery.

In one or more aspects, the predefined charge level may comprise a lower charge than the gauged charge level. Alternatively, in one or more other aspects, the predefined charge level may comprise a higher charge than the gauged charge level. The predefined charge level can be set by the input terminal 110.

After the detection of the state of the switch 106 and estimation of the time value for which the switch 106 should be disposed in that state, the controller 107 triggers switch to the closed state 108 or open state 109 according to the requirement and the timer 105 tracks time for which switch is to be that state. Herein the closed state 108 of the switch 106 corresponds to a charging state wherein the rechargeable battery is disposed in electrical communication with the electrical sockets and the electricity flows from the power source to downstream of the switch 106 and charge the rechargeable battery. Conversely, while the switch 106 is in the open state 109 which corresponds to a discharging state, the electrical communication between the power source and the rechargeable battery is disabled and the electricity can not flow from the power source to downstream of the switch 106. During the open state 109 of the switch 106 the rechargeable battery may discharge.

Therefore, the present electrical extension cord 100 having the extended conducting media 101 with time or charge level dependent electrical connection interrupting facility, is particularly suitable for connecting the appliance or devices like cell-phone, e-reader etc which incorporate rechargeable batteries with wall socket which are difficult for a user to reach the (since it may be behind a heavy desk, for example) to plug/unplug the extension cord. The current invention allows the user to use an integrated device which can automatically change operating status of the appliance or charging status of the device incorporating rechargeable batteries in accordance with time or charge level set by the user without having to reach behind some heavy/difficult to move object to connect/disconnect the cord.

In one or more embodiments, the electrical extension cord 100 step up or down voltage of the power source in accordance with the requirement of the appliance or the rechargeable battery. In particular the electrical extension cord 100 may further comprise converter circuitry (not shown) for facilitating use in multiple regions having varying power source voltage and/or frequency standards. For example, the electrical extension cord 100 may be stepped up from 110V use to 220V use, and vice-versa, without the aid of any additional devices.

In embodiment shown in the FIGS. 1-4, the outlet 103 for accepting the plug from the device incorporating rechargeable battery, the recharging the battery of, for instance, a cordless drill or screwdriver, the outlet 103 receives the 110V AC power cable of the device. If the device is, for instance, a cell phone, so-called e-Reader, or portable music or video player, the outlet 103 may be a plug for receiving the USB cable. A user-set timer 105 is provided that facilitates the switching power to the outlet 103 off so that, at the conclusion of the time set on timer 105 by user or controller 107, the rechargeable device or battery is disconnected from the power by circuitry contained within enclosure 104 so that battery charging stops. In one or more embodiments (not shown), a circuitry is provided for detecting the "charged" or "charge complete" message, light, or other indicator.

In another embodiment, in lieu of or in conjunction with the time based electrical connection controlling module 104, a charge based electrical connection controlling module (not shown) is provided inline with the conducting media 101 and separated from said power input connector 102. The charge based electrical connection controlling module can include a charge sensor, a controller and a switch (not shown). The charge based electrical connection controlling module can be configured to continuously track the desired amount of charge required to optimally operate the device incorporating the rechargeable battery. After the desired charge level for which the switch is to be in a closed or open state is reached, the charge sensor produces a signal to the controller and in accordance with the signal received, the controller can trigger a change in the switch state instantly or after a previously specified charge level.

As will be appreciated by one skilled in the art, the embodiments of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having non-transitory computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program instructions or code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Computer program instructions may be provided to a processor of a general purpose computer, special purpose computer, or other programmable data processing apparatus to produce a machine, such that the instructions, which execute via the processor of the computer or other programmable data processing apparatus, create means for interrupting the charging state of the rechargeable battery.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts for interrupting the charging state of the rechargeable battery.

In one or more embodiments, methods, systems and computer program products for interrupting the charging status of a rechargeable battery are disclosed. The rechargeable battery includes a plug for connecting to a power source; an outlet for receiving a plug capable of transferring power to the rechargeable battery; a switch configured to selectively be in either a closed state or an open state, wherein the open state corresponds to discharging state charging state, the open state corresponds to a discharging state, and wherein while the switch is in the closed state, electricity flows from the power source to downstream of the switch; and while the switch is in the open state, electricity does not flow from the power source to downstream of the switch; and a controller for controlling the charging state of the switch or the discharging state of the switch for reaching a predetermined optimal charge level in the rechargeable battery.

A computer-implemented method for interrupting a charging or discharging status of a rechargeable battery includes: (A) predetermining at least one of: (i) an optimal charge level required to operate the device for a desired amount of time and/or (ii) an approximate amount of time for the rechargeable battery to reach a desired charge level; (B) continuously tracking at least one of: the charge level in the battery and/or the amount of time when the battery is either in a charging or discharging state; and (C) automatically interrupting the charging or discharging status of the rechargeable battery in dependence on at least one of the following conditions: (i) the tracked charge level substantially reaches the predetermined optimal charge level required to operate the device for a desired amount of time; and/or (ii) the amount of time when the battery is either in the charging or discharging state is substantially approximate the amount of time for the rechargeable battery to reach the desired charge level.

In another embodiment, a system for interrupting a charging or discharging status of a rechargeable battery is disclosed. The system includes a physical processor; and a computer memory operatively coupled to the physical processor, the computer memory having disposed within it: (A) computer readable program code configured to predetermine at least one of: (i) an optimal charge level required to operate the device for a desired amount of time and/or (ii) an approximate amount of time for the rechargeable battery to reach a desired charge level; (B) computer readable program code configured to continuously track at least one of: the charge level in the battery and/or the amount of time when the battery is either in a charging or discharging state; and (C) computer readable program code configured to automatically interrupt the charging or discharging status of the rechargeable battery in dependence on at least one of the following conditions: (i) the tracked charge level substantially reaches the predetermined optimal charge level required to operate the device for a desired amount of time; and/or (ii) the amount of time when the battery is either in the charging or discharging state is substantially approximate the amount of time for the rechargeable battery to reach the desired charge level.

In yet another embodiment, a computer program product for interrupting a charging or discharging status of a rechargeable battery is disclosed. The computer program product includes: a non-transitory computer readable storage medium having computer readable program code embodied therewith, the computer readable program code for: (A) predetermining at least one of: (i) an optimal charge level required to operate the device for a desired amount of time and/or (ii) an approximate amount of time for the rechargeable battery to reach a desired charge level; (B) continuously tracking at least one of: the charge level in the battery and/or the amount of time when the battery is either in a charging or discharging state; and (C) automatically interrupting the charging or discharging status of the rechargeable battery in dependence on at least one of the following conditions: (i) the tracked charge level substantially reaches the predetermined optimal charge level required to operate the device for a desired amount of time; and/or (ii) the amount of time when the battery is either in the charging or discharging state is substantially approximate the amount of time for the rechargeable battery to reach the desired charge level.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

I claim:

1. A timer operable electrical extension cord comprising:
    a conducting media capable of transmitting electric current, the conducting media providing a desired extended operative connection between at least a power input connector to a power source or one or more electrical sockets at one end of the conducting media and a power output connector at an other end of the conducting media to any intermittently operable or charge dependent electrically operable unit;
    a controller and a cooperative timer based switchable on and off electrical operation operatively connected to the conducting media and separated from the connector to a power source or electrical sockets for intermittently or charge dependent electrical operation;
    a switch configured to selectively be in either the switchable on or off state wherein the switchable on state operatively connects the intermittently operable or charge dependent electrically operable unit with the power source or electrical sockets and the switchable off state operatively disconnects the intermittently operable or charge dependent electrically operable unit with the power source or electrical sockets, wherein the controller automatically adjusts a time duration for which the switch is to be in the on state for charging a device comprising a rechargeable battery up to a predefined charge level; and
    a timer for continuously tracking a desired time duration for which the switch is to be either in the on state or in the off state and cooperating with the controller to trigger a corresponding change in the switching state of the extension cord, wherein the controller includes an estimator for an amount of the time duration by:
        storing charge behavior data of the rechargeable battery;
        gauging a charge level of the rechargeable battery by calculating a ratio of amount of charge remaining in the rechargeable battery to the total charge capacity of the rechargeable battery;
        reading stored charge behavior data of the rechargeable battery; and
        extrapolating based on the charge level and the charge behavior data.

2. The timer operable electrical extension cord of claim 1, wherein the controller further comprises an input terminal, the input terminal facilitating provision of instructions including the time duration for enabling and/or disabling electrical communication between an appliance or the rechargeable battery and the power source or electrical sockets to the timer.

3. The timer operable electrical extension cord of claim 2, wherein the input terminal comprises a rotary dial.

4. The timer operable electrical extension cord of claim 2, wherein the power output connector for accepting the plug from the appliance or from the device incorporating a rechargeable battery comprises female contacts preferably 2-prong plug, 3-prong plug, USB connector/receptor, micro USB connector or 30-pin connector.

5. The timer operable electrical extension cord of claim 2, comprising a converter for facilitating stepped up or down voltage of the power source in accordance with a requirement of the appliance or the rechargeable battery.

6. The timer operable electrical extension cord of claim 2, wherein the input terminal comprises a keypad.

7. The timer operable electrical extension cord of claim 1, wherein the timer comprises an analog display.

8. The timer operable electrical extension cord of claim 1, wherein the timer comprises a digital display.

9. The timer operable electrical extension cord of claim 1, wherein the timer is configured to receive instructions corresponding to the duration of time between receiving the instructions and producing a signal to the controller, the signal triggering a change of the switch state instantly or after a previously specified time delay.

10. The timer operable electrical extension cord of claim 1, wherein the power input connector for placement in electrical communication with any other type of power source or electrical socket comprises male contacts preferably 2-prong plug, 3-prong plug, or similar plug type.

11. The timer operable electrical extension cord of claim 1, comprising a socket adaptor to adapt a first type of socket to a desired second type of socket.

12. The timer operable electrical extension cord of claim 1, wherein the controller and cooperative timer based switch is further adapted to intermittently disable or enable the electrical connection between the power source or electrical sockets and the device incorporating the rechargeable for ensuring the predefined charge level in the rechargeable battery.

13. The timer operable electrical extension cord of claim 1, wherein the controller is adapted to determine the switch is to be either in the on state or in the off state for ensuring the predefined charge level in the rechargeable battery.

14. The timer operable electrical extension cord of claim 1, wherein the controller further automatically adjusts the time duration for which the switch is to be in the off state in which the rechargeable battery may discharge for reaching to the predefined charge level by way of discharging.

15. The timer operable electrical extension cord of claim 1, wherein the controller controls the state of the switch based on a predefined modified charge level in the rechargeable battery which includes a lower charge than the gauged charge level or a higher charge than the gauged charge level.

16. The timer operable electrical extension cord of claim 1, wherein the timer tracks the estimated time duration for which the switch is to be in the enable or in the disable state.

17. A method for intermittently interrupting the electrical communication between the intermittently operable or charge dependent electrically operable unit and a power source or electrical socket involving a timer operable electrical extension cord, comprising:
    providing operative connection of the intermittently operable or charge dependent electrically operable unit to the power source through the timer operable electrical extension cord comprising:
        a conducting media capable of transmitting electric current, the conducting media providing a desired extended operative connection between at least a power input connector to a power source or one or more electrical sockets at one end of the conducting media and a power output connector at an other end of the conducting media to any intermittently operable or charge dependent electrically operable unit;

a controller and a cooperative timer based switchable on and off electrical operation operatively connected to the conducting media and separated from the connector to a power source or electrical sockets for intermittently or charge dependent electrical operation;

a switch configured to selectively be in either the switchable on or off state wherein the switchable on state operatively connects the intermittently operable or charge dependent electrically operable unit with the power source or electrical sockets and the switchable off state operatively disconnects the intermittently operable or charge dependent electrically operable unit with the power source or one or more electrical sockets, wherein the controller automatically adjusts a time duration for which the switch is to be in the on state for charging a device comprising a rechargeable battery up to a predefined charge level; and a timer for continuously tracking a desired time duration for which the switch is to be either in the on state or in the off state and cooperating with the controller to trigger a corresponding change in the switching state of the extension cord, wherein the controller includes an estimator for an amount of the time duration by:

storing charge behavior data of the rechargeable battery;

gauging a charge level of the rechargeable battery by calculating a ratio of amount of charge remaining in the rechargeable battery to the total charge capacity of the rechargeable battery;

reading stored charge behavior data of the rechargeable battery; and extrapolating based on the charge level and the charge behavior data;

disposing the switch either in the on state for providing operative connection between the power input connector and the power output connector through the conducting media in order to dispose the electrically operable unit in electrical communication with the electrical socket or in the off state for disabling the operative connection between the power input connector and the power output connector through the conducting media in order to detach the electrically operable unit from the electrical socket;

receiving the time duration for disposing the switch in the respective state through the controller;

initiating the time tracking by involving the timer and producing signal to the controller on elapsing the time duration; and triggering a change in the switch state by involving the controller on receiving the signal from the timer.

* * * * *